United States Patent
Buchanan (10) Patent No.: US 11,692,584 B2
(45) Date of Patent: Jul. 4, 2023

(54) METHOD AND SYSTEM FOR RETAINING A FASTENER

(71) Applicant: Lockheed Martin Corporation, Bethesda, MD (US)

(72) Inventor: William B. Buchanan, Arlington, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 555 days.

(21) Appl. No.: 16/750,848

(22) Filed: Jan. 23, 2020

(65) Prior Publication Data

US 2021/0231161 A1 Jul. 29, 2021

(51) Int. Cl.
  *F16B 41/00* (2006.01)
  *F16B 5/02* (2006.01)
  *B64C 1/12* (2006.01)

(52) U.S. Cl.
  CPC ............ *F16B 41/002* (2013.01); *B64C 1/12* (2013.01); *F16B 5/0208* (2013.01); *F16B 5/0266* (2013.01); *F16B 41/00* (2013.01)

(58) Field of Classification Search
  CPC .... F16B 5/0208; F16B 5/0233; F16B 5/0266; F16B 21/16; F16B 21/18; F16B 41/002; F16B 41/00; B64C 1/12; Y10S 411/999
  USPC ......... 411/352, 353, 383, 384, 516–517, 522
  See application file for complete search history.

(56) References Cited

U.S. PATENT DOCUMENTS

| | | | | |
|---|---|---|---|---|
| 2,992,685 A * | 7/1961 | Madsen | ..................... | F16B 5/10 411/262 |
| 5,082,406 A | 1/1992 | Cosenza | | |
| 5,382,124 A | 1/1995 | Frattarola | | |
| 6,095,736 A * | 8/2000 | Miller | ................... | F16B 41/002 411/352 |
| 6,296,431 B1 * | 10/2001 | Miller | ................... | F16B 5/0208 411/389 |
| 6,419,192 B1 | 7/2002 | Riecke | | |
| 6,464,438 B1 | 10/2002 | Dowling | | |
| 7,114,899 B2 | 10/2006 | Gass et al. | | |
| 8,011,867 B2 * | 9/2011 | Shepherd | .............. | F16B 5/0208 411/383 |
| 8,016,529 B2 | 9/2011 | Robinson et al. | | |
| 8,434,983 B2 * | 5/2013 | Chen | ...................... | F16B 5/0208 411/347 |
| 8,454,287 B2 * | 6/2013 | Ye | ....................... | H01L 23/4006 411/353 |
| 8,511,956 B2 * | 8/2013 | Liu | ..................... | H01L 23/4006 411/107 |

(Continued)

FOREIGN PATENT DOCUMENTS

| | | |
|---|---|---|
| DE | 4141573 | 8/1994 |
| DE | 19640162 | 4/1997 |
| GB | 1027931 | 4/1966 |

*Primary Examiner* — Roberta S Delisle
(74) *Attorney, Agent, or Firm* — Baker Botts L.L.P.

(57) ABSTRACT

An apparatus for securing a panel to a structure is provided. In one embodiment, the fastener includes a fastener having a fastener head and a threaded tail, and the fastener may be disposed through a structure and an external panel. The apparatus also includes a retainer housing positioned on the fastener head, where the retainer housing is detached from the fastener. A spring engaging the fastener and the retainer housing is also included within the retainer housing.

19 Claims, 7 Drawing Sheets

(56) References Cited

U.S. PATENT DOCUMENTS

| | | | |
|---|---|---|---|
| 8,622,673 B2* | 1/2014 | Wong | F16B 5/0266 |
| | | | 411/347 |
| 8,770,902 B1* | 7/2014 | Miller | F16B 5/0208 |
| | | | 29/451 |
| 8,979,458 B2* | 3/2015 | Sun | F16B 41/002 |
| | | | 411/353 |
| 10,695,877 B1* | 6/2020 | Miller | F16B 5/10 |
| 2005/0019133 A1* | 1/2005 | Allen | H05K 7/14 |
| | | | 411/353 |
| 2006/0275100 A1* | 12/2006 | Aukzemas | F16B 37/145 |
| | | | 411/353 |
| 2007/0053761 A1 | 3/2007 | Cohen et al. | |
| 2009/0142158 A1* | 6/2009 | Dai | F16B 41/002 |
| | | | 411/353 |

* cited by examiner

METHOD AND SYSTEM FOR RETAINING A FASTENER

TECHNICAL FIELD

This disclosure relates in general to retaining systems for aircraft and more particularly to a method and system for retaining a fastener.

BACKGROUND

Fastener retaining systems may be used to secure a panel to an internal structure. In the context of aircraft, retaining systems are used to secure an external panel to an adjacent, internal structure. Traditional retaining systems include a fastener and a nut plate. The fastener is installed from the exterior of the aircraft, with the fastener head protruding from the external surface of the aircraft.

SUMMARY OF THE DISCLOSURE

According to one embodiment, an apparatus for securing a panel to a structure is provided. The fastener includes a fastener having a fastener head and a threaded tail, and the fastener may be disposed through a structure and an external panel. The apparatus also includes a retainer housing positioned on the fastener head, where the retainer housing is detached from the fastener. A spring engaging the fastener and the retainer housing is also included within the retainer housing.

According to another embodiment, a method of securing a panel to a structure, includes aligning a threaded hole of an external aircraft panel with an aperture of a structure adjacent the external aircraft panel. The structure has a top side and a bottom side, and the top side faces away from the external aircraft panel while the bottom side faces the external aircraft panel. The method also includes inserting a fastener through the aperture and the threaded hole. The fastener has a fastener head and a threaded tail, a retainer housing with a spring disposed therein is positioned on the fastener head, and the retainer housing is detached from the fastener. The method also includes positioning the fastener head to face the top side of the structure opposite the external aircraft panel, securing the retainer housing to the structure; and tightening the fastener to secure the external aircraft panel to the structure, thereby securing the external aircraft panel to the structure without leaving the fastener head protruding from the external aircraft panel.

Technical advantages of certain embodiments may include the ability to retain a fastener head and retainer housing internally to an aircraft. Other technical advantages will be readily apparent to one skilled in the art from the following figures, descriptions, and claims. Moreover, although specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following description, taken in conjunction with the accompanying drawings, in which.

DETAILED DESCRIPTION OF THE DISCLOSURE

The teachings of the disclosure recognize that a problem with existing fastener retaining systems is that, when implemented on an aircraft, they leave the fastener protruding from the aircraft. The external protrusion of the fastener diminishes the outer mold line (OML) of the aircraft, causing undesirable drag and other performance degradation. Additionally, with conventional fastener retaining systems, a nut plate is typically glued internally to an internal aircraft surface, and the nut plate serves to allow a fastener to penetrate the internal aircraft surface and secure the internal aircraft surface to an external panel. With such conventional retaining systems, the fastener is inserted and tightened from the fastener head side of the fastener, positioned external to and protruding from the aircraft. Tightening the fastener causes torque to be applied to the nut plate, often leading to failure of the nut plate and necessitating invasive replacement procedures.

The teachings of the disclosure recognize that by positioning the head of the fastener inside an aircraft or other structure, and using a retainer housing and spring to accept the downward force applied on the fastener, these above problems can be addressed. Such positioning of the head of the fastener in relation to the aircraft or other structure allows for an optimal OML and a reduction in the failure of conventional components such as nut plates. The following describes systems and methods of fastener retaining for providing these and other desired features.

Figure 1A:
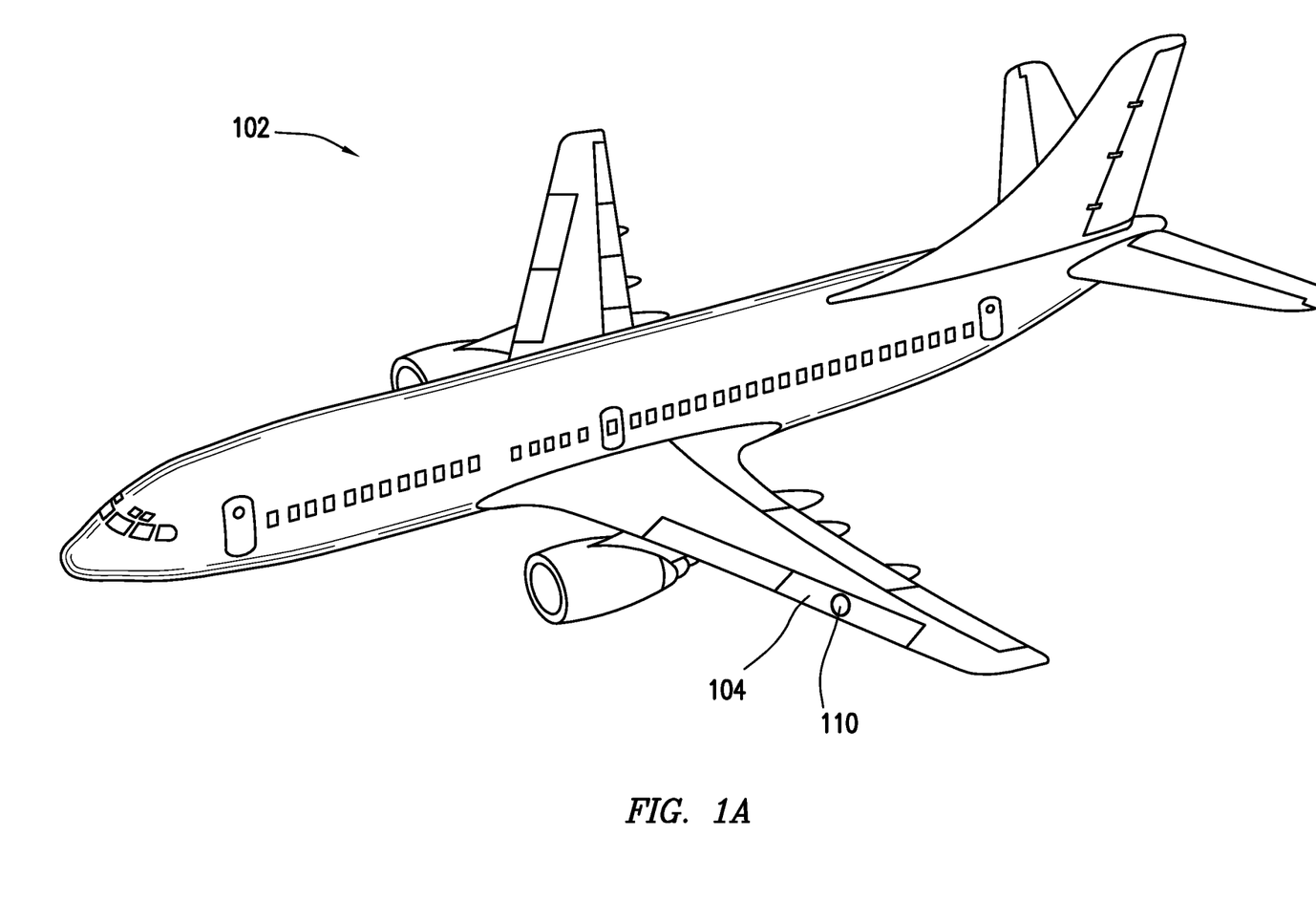
FIG. 1A is a diagram of an aircraft with a fastener retaining system incorporated in conjunction with an external aircraft panel, according to certain embodiments.

FIG. 1A is a diagram of an aircraft with a fastening retaining system incorporated in conjunction with an external aircraft panel, according to certain embodiments. As shown in FIG. 1A, retaining system 110 may be incorporated in conjunction with external aircraft panel 104 and installed on aircraft 102.

Figure 1B:
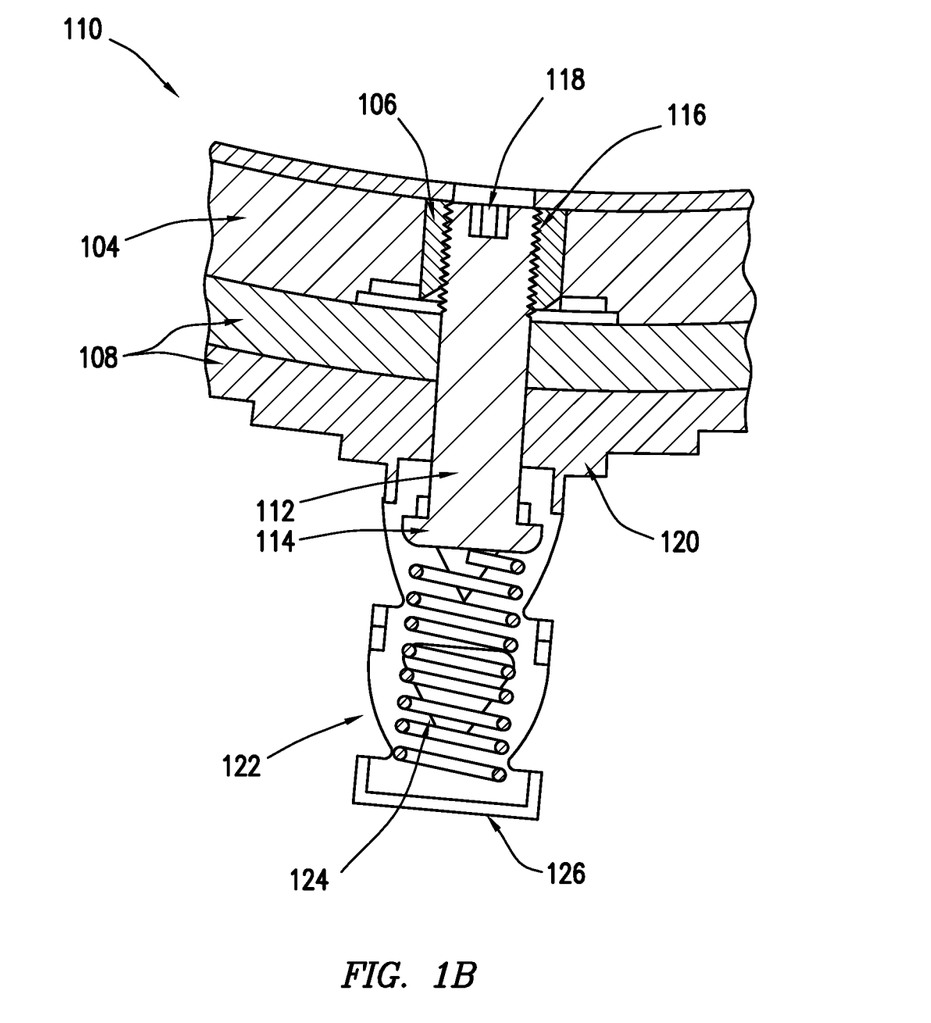
FIG. 1B is a schematic of a fastener retaining system that may be incorporated in conjunction with the external aircraft panel of FIG. 1A, according to certain embodiments.

FIG. 1B is a schematic of a fastener retaining system that may be incorporated in conjunction with the external aircraft panel of FIG. 1A, according to certain embodiments. As shown in FIG. 1B, retaining system 110 may include, in some embodiments, a fastener 112, a fastener base 120, a retainer housing 122, a spring 124, and a retaining clip 126. In certain embodiments, external panel 104 and/or structure 108 may be incorporated in conjunction with retaining system 110. External panel 104 may include a threaded hole 106. Fastener 112 may include a fastener head 114, threaded tail 116, and wrench insert 118.

In general, certain components within retaining system 110 are inverted in relation to conventional retaining systems. In some embodiments described herein, structure 108 has a top side and a bottom side, the top side facing away from external panel 104 and the bottom side facing external panel 104. Thus, by positioning the fastener head 114 such that it faces the top side of the structure 108 opposite the external panel 104, rather than the external side of the external panel 104, and positioning the retainer housing 122 on the fastener head 114, the fastener head 114 and retainer housing 122 can be maintained internally to the structure, in accordance with various methods described herein. This provides, in some embodiments, several advantages, such as the ability to maintain an optimal outer mold line (OML) and avoid the failure of conventional fastener retaining components.

External panel 104 is the outermost layer that may be implemented in conjunction with retaining system 110. Such layer may be a layer of an aircraft such as a wing of an aircraft, a removeable layer that may be attached to an aircraft, or other suitable layer. External panel 104 may comprise a metallic or non-metallic material. In some embodiments, external panel 104 has a threaded hole 106. Threaded hole 106 allows a fastener 112 to penetrate external panel 104 and secure external panel 104 to another surface. The threads in threaded hole 106 allow the threaded tail 116 of fastener 112 to engage the threaded hole 106 as the fastener 112 is tightened. In some embodiments, threaded hole 106 may be a threaded portion within external panel 104 and extending through external panel 104. For example, the threaded hole 106 may be machined as part of external panel 104. In other embodiments, threaded hole 106 may be a threaded bushing that is inserted into a suitable hole in external panel 104.

Structure 108 is positioned adjacent to external panel 104 and may comprise any structure that may be secured against external panel 104. Structure 108 may further be a single layer or multiple layers. Structure 108 may further have an aperture allowing fastener 112 to penetrate structure 108. The aperture in structure 108 may be aligned with the threaded hole 106 in external panel 104. In some embodiments, structure 108 has a top side and a bottom side, the top side facing away from the external panel 104 and the bottom side facing external panel 104. Where external panel 104 is a layer of an aircraft such as a wing of an aircraft, external panel 104 is positioned between the outside air and structure 108.

Fastener 112 may comprise any fastener for securing structure 108 to external panel 104. Examples include bolts and screws. Fastener 112 may further comprise a fastener head 114 and a threaded tail 116, in some embodiments. The fastener head may be positioned such that it faces the top side of the structure 108 opposite the external aircraft panel 104. Such embodiments allow the fastener head 112 to be retained internal to the structure 108 and avoids having the fastener head 114 protrude from the external panel 104. Threaded tail 116 may have any type of threading sufficient to allow the threaded tail 116 to engage the threaded hole 106 of external panel 104 as the fastener 112 is tightened. In some embodiments, fastener 112 may further comprise a wrench insert 118. Wrench insert 118 allows a tool such as an Allen wrench to engage and tighten fastener 112. In some embodiments, wrench insert 118 is positioned on the threaded tail 116 side of fastener 112. Such embodiments allow access to the fastener 112 from the external side of the external panel 104. Where external panel 104 comprises a wing of an aircraft, fastener 112 can be accessed and tightened from the outside of the aircraft. In other embodiments, wrench insert 118 is positioned on the fastener head 114 side of fastener 112.

Fastener base 120 may comprise any material sufficient attach to structure 108 and retainer housing 122. Examples of such materials include plastic and metal. In some embodiments, fastener base 120 may be glued to structure 108 and/or retainer housing 122. In some embodiments, fastener base 120 may contain one or more apertures for securing fastener base 120 to structure 108 using standard fasteners. In some embodiments, fastener base 120 and retainer housing 122 are a single, inseparable component.

Retainer housing 122 may be comprised of any material sufficient to attach to fastener base 120 and retain fastener 112. Examples of such materials include plastic and metal. In some embodiments, retainer housing 122 may be secured to fastener base 120 using a standard retaining clip. In some embodiments, retainer housing has a top side and a bottom side, the top side facing away from the structure 108 and the bottom side facing the structure 108. A C-clip 126 may be disposed between the top side of the retainer housing 122 and the spring 124 within the retainer housing 122. Retainer housing 122 is of sufficient size and shape to allow retainer housing to be positioned on fastener 112 and have a spring 124 and C-clip 126 disposed therein. The top side of retainer housing 122 may also be enclosed such that no C-clip 126 is necessary. In some embodiments, retainer housing 122 and fastener base 120 are not structural to fastener 112 and are detached from fastener 112. Such an embodiment allows fastener 112 to spin freely within retainer housing 122 without applying a torque to retainer housing 122 or fastener base 120. For example, in certain embodiments fastener 112 can be accessed by engaging wrench insert 118 in the threaded tail 116 side of fastener 112, and fastener 112 may be tightened through external panel 104 and structure 108. In these embodiments, the fastener head 114 applies force against the spring 124 and C-clip 126, while retainer housing 122 simply retains fastener 112, spring 124, and C-clip 126 in place. Spring 124 may be any spring capable of engaging fastener 112 during installation. Spring 124 may also allow fastener 112 to remain accessible for repair or replacement when external panel 104 and/or structure 108 are removed. C-clip 126 may similarly be any type of C-clip capable of engaging the spring 124 and securing the spring 124 within the retainer housing 122. A suitable washer may also be placed between spring 124 and C-clip 126.

Figure 1C:
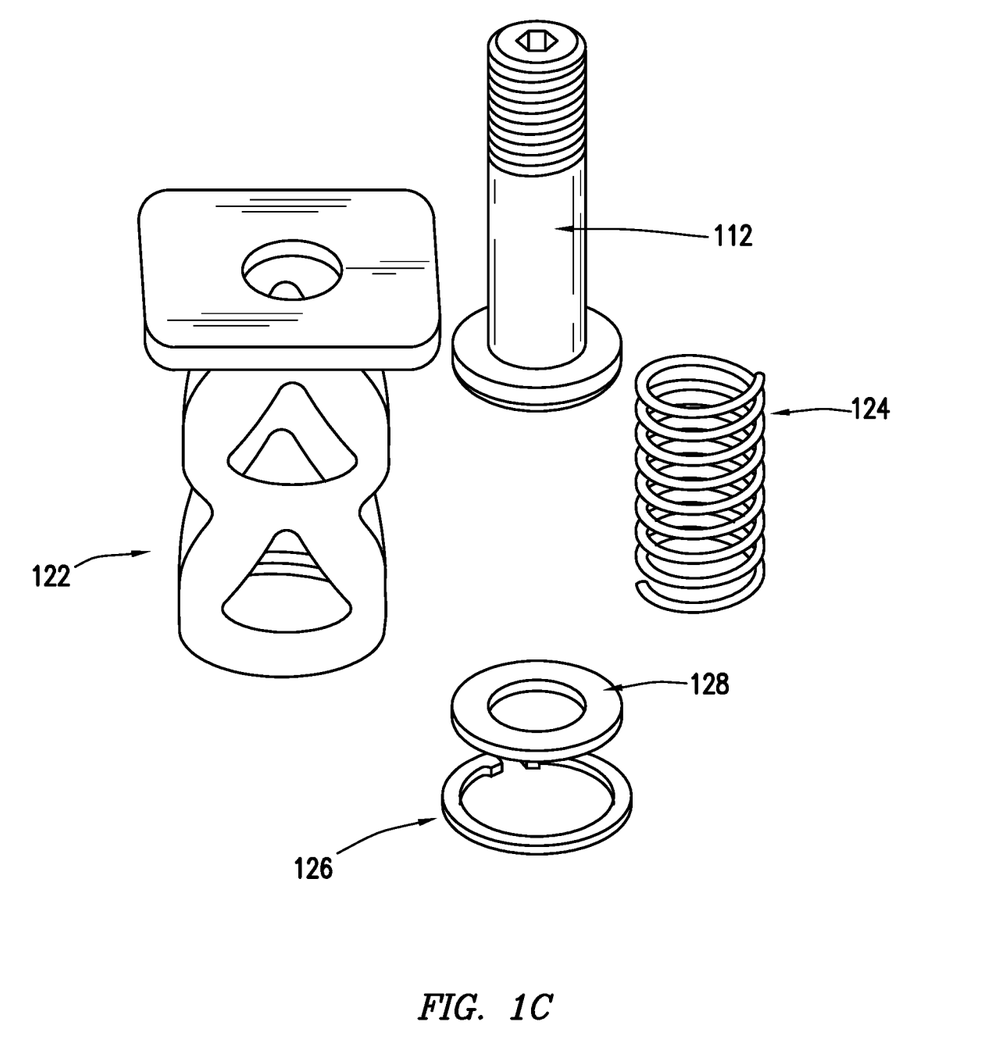
FIG. 1C is an exploded diagram of certain components of FIG. 1B, according to certain embodiments.

FIG. 1C is an exploded diagram of certain components of FIG. 1B, according to certain embodiments. As shown in FIG. 1C, retaining system 110 may comprise a retainer housing 122, fastener 112, spring 124, and C-clip 126. Retaining system 110 may further comprise a suitable washer 128 positioned between the spring 124 and C-clip 126. These components are described in further detail with respect to FIG. 1B.

In operation, retaining system 110 may be implemented on an aircraft using various techniques described herein. For example, retainer housing 122 and its internal components, spring 124 and C-clip 126, may be permanently installed on the internal side of structure 108. Retainer housing 120 may further be attached to structure 108 and secured to retainer housing 122 with a retaining clip. Fastener 108 may be positioned through the aperture in structure 108 such that the fastener head faces the top side of the structure 108 opposite the external panel 104. Fastener 112 may be tightened into external panel 104 by engaging the wrench insert 118 and tightening the threaded tail 116 of fastener 116 into the threaded hole 106 of external panel 104.

Figure 2A:
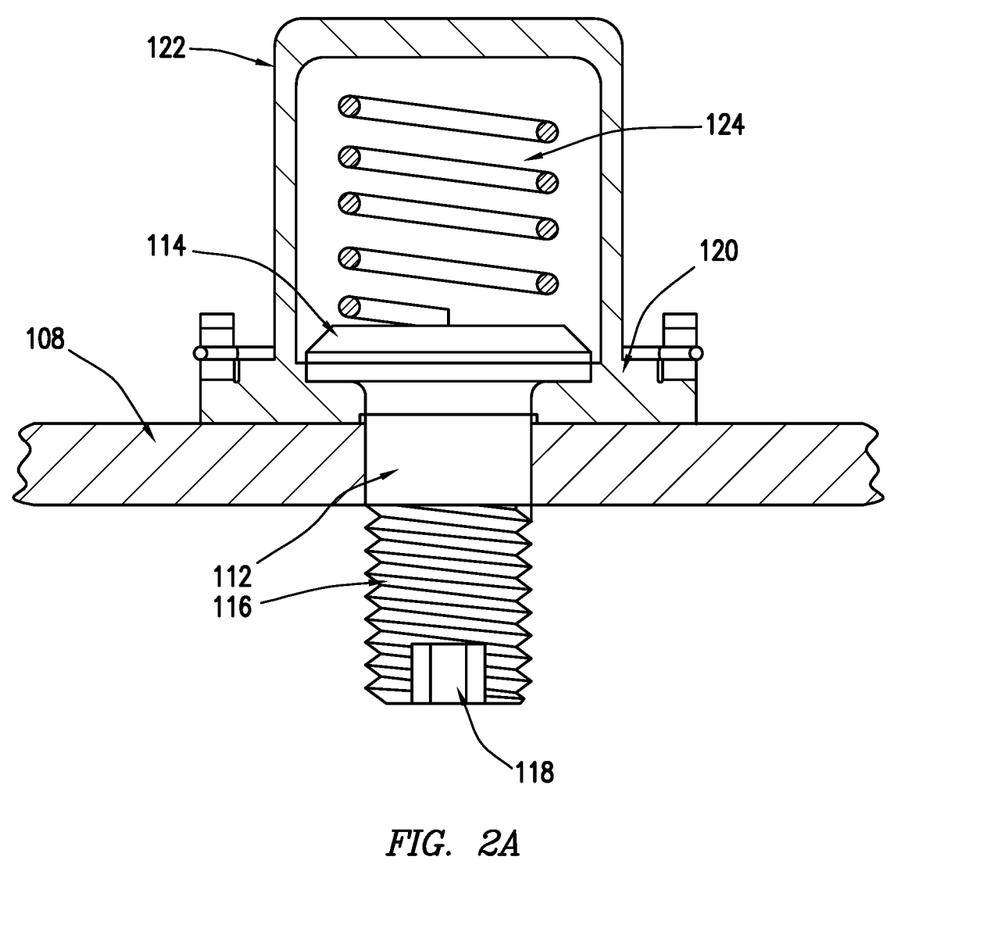
FIG. 2A is a section view schematic of certain components of the fastener retaining system of FIG. 1B, according to certain embodiments.

FIG. 2A is a section view schematic of certain components of the fastener retaining system of FIG. 1B, according to certain embodiments. As shown in FIG. 2A, retaining system 110 may comprise a fastener 112, base structure 120, retainer housing 122, spring 124. Fastener 112 may further comprise fastener head 114, threaded tail 116, and wrench insert 118. In some embodiments, retaining system 110 may be incorporated in conjunction with external panel 104 and/or structure 108.

Figure 2B:
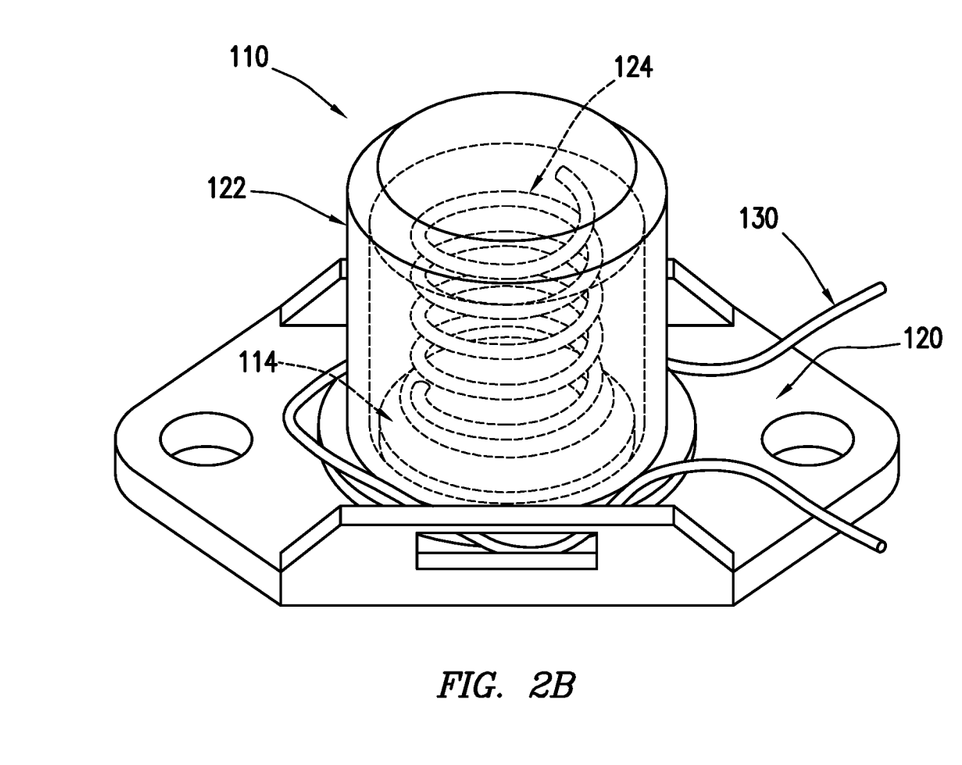
FIG. 2B is an isometric view schematic of certain components of FIG. 2A, according to certain embodiments.

FIG. 2B is an isometric view schematic of certain components of FIG. 2A, according to certain embodiments. As shown in FIG. 2B, retaining system 110 may comprise fastener head 114 of fastener 112, base structure 120, retainer housing 122, spring 124, and retaining clip 130. In some embodiments, retaining system 110 may be incorporated in conjunction with external panel 104 and/or structure 108. Fastener base 120 may contain one or more apertures for securing fastener base 120 to structure 108 using standard fasteners. Fastener base 120 may also be glued to structure 108 and/or retainer housing 122. In some embodiments, fastener base 120 and retainer housing 122 are a single, inseparable component.

Figure 3A:
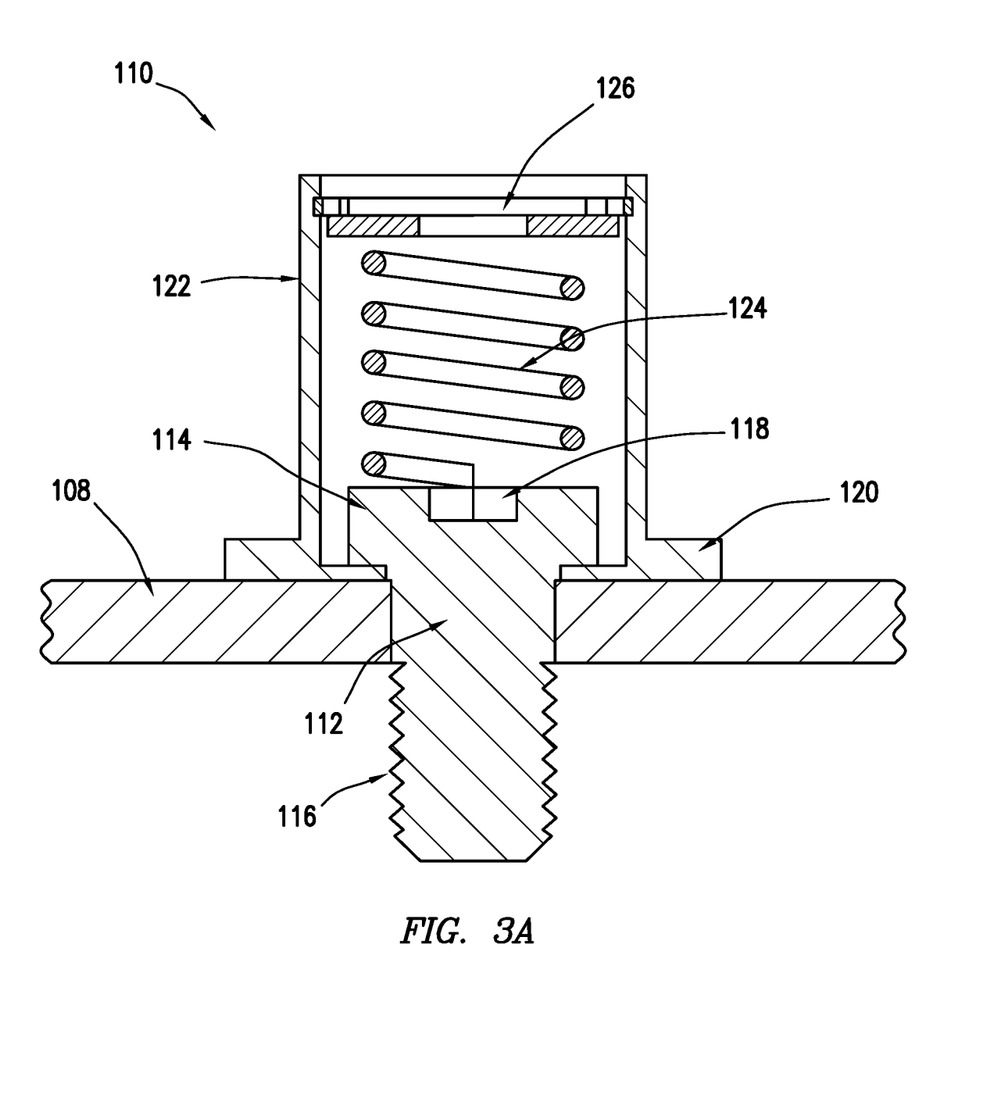
FIG. 3A is a section view schematic of certain components of the fastener retaining system of FIG. 1B, according to certain embodiments.

FIG. 3A is a section view schematic of certain components of the fastener retaining system of FIG. 1B, according to certain embodiments. As shown in FIG. 3A, retaining system 110 may comprise a fastener 112, base structure 120, retainer housing 122, spring 124, and C-clip 126. Fastener 112 may further comprise fastener head 114, threaded tail 116, and wrench insert 118. In some embodiments, retaining system 110 may be incorporated in conjunction with external panel 104 and/or structure 108.

Figure 3B:
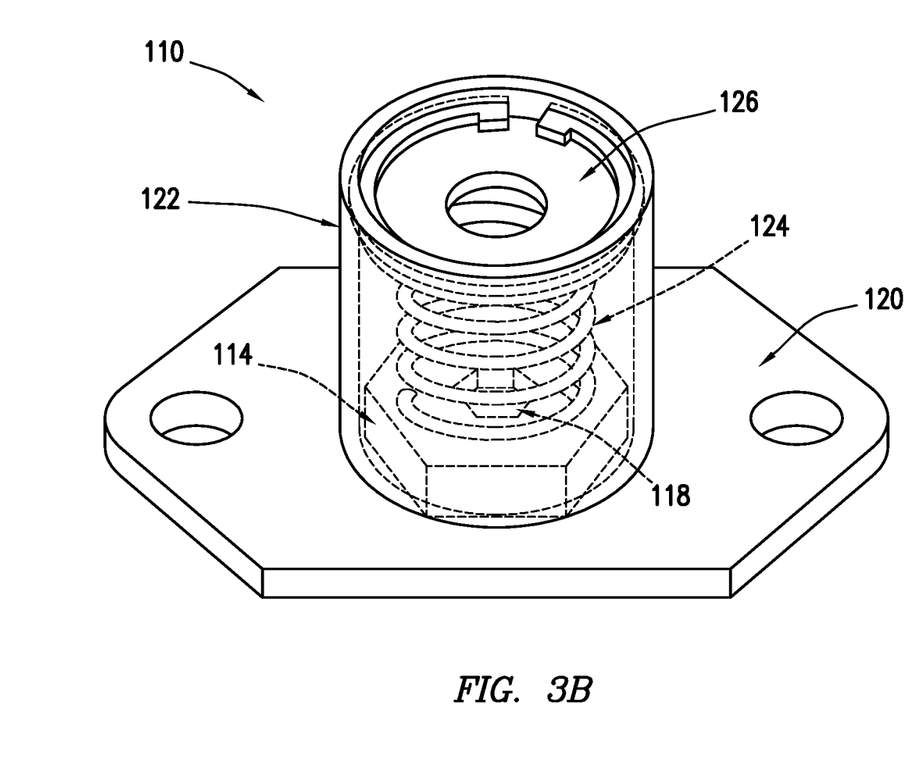
FIG. 3B is an isometric view schematic of certain components of FIG. 3A, according to certain embodiments.

FIG. 3B is an isometric view schematic of certain components of FIG. 3A, according to certain embodiments. As shown in FIG. 3B, retaining system 110 may comprise fastener head 114 and wrench insert 118 of fastener 112, base structure 120, retainer housing 122, spring 124, and C-clip 126. In some embodiments, external panel 104 and/or structure 108 may be incorporated in conjunction with retaining system 110. Fastener base 120 may contain one or more apertures for securing fastener base 120 to structure 108 using standard fasteners. Fastener base 120 may also be glued to structure 108 and/or retainer housing 122. In some embodiments, retainer housing 122 may be secured to fastener base 120 using retainer clip 130. In some embodiments, fastener base 120 and retainer housing 122 are a single, inseparable component.

A number of implementations have been described. Nevertheless, it will be understood that various modifications may be made without departing from the spirit and scope of the invention. Elements of different implementations described herein may be combined to form other implementations not specifically set forth above. Elements may be left out of the processes, structures, and systems described herein without adversely affecting their operation. Furthermore, various separate elements may be combined into one or more individual elements to perform the functions described herein. Although certain example embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. An apparatus for securing a panel to a structure, comprising:
    an external aircraft panel having a threaded hole;
    a structure adjacent the external aircraft panel having an aperture aligned with the threaded hole, the structure having a top side and a bottom side, the top side facing away from the external aircraft panel and the bottom side facing the external aircraft panel;
    a fastener comprising a fastener head and a threaded tail, the fastener disposed through the aperture and the threaded hole, wherein the fastener head faces the top side of the structure opposite the external aircraft panel, the fastener further comprising a wrench insert in the threaded tail of the fastener;
    a fastener base positioned between the fastener head and the structure, and secured to the structure;
    a retainer housing positioned on the fastener head, wherein the fastener base and retainer housing are detached from the fastener;
    a spring within the retainer housing engaging the fastener and the retainer housing; and
    a retaining clip in contact with the fastener base and securing the retainer housing to the fastener base, wherein the external aircraft panel is secured to the structure without the fastener protruding from the external aircraft panel.

2. The apparatus of claim 1, wherein the external aircraft panel comprises a wing of an aircraft.

3. The apparatus of claim 1, wherein the threaded hole comprises a threaded bushing.

4. The apparatus of claim 1, wherein the fastener base is secured to the structure with glue.

5. The apparatus of claim 1, wherein the fastener base comprises a plurality of apertures to secure the fastener base to the structure.

6. The apparatus of claim 1, wherein the fastener base is secured to the retainer housing with glue.

7. An apparatus for securing a panel to a structure, comprising:
    a fastener comprising a fastener head, a threaded tail, and a wrench insert in the threaded tail of the fastener, the fastener configured to be disposed through a structure and an adjacent external panel;
    a retainer housing positioned on the fastener head, the retainer housing being detached from the fastener;
    a fastener base;
    a retaining clip configured to contact the fastener base and to secure the retainer housing to the fastener base; and
    a spring within the retainer housing engaging the fastener and the retainer housing.

8. The apparatus of claim 7, and further comprising the external panel and the structure adjacent the external panel, an aperture in the structure aligned with a threaded hole in the external panel, wherein the structure has a top side and a bottom side, and wherein the fastener head faces the top side of the structure opposite the external panel.

9. The apparatus of claim 8, wherein the threaded hole comprises a threaded bushing.

10. The apparatus of claim 8, wherein the retainer housing has a top side and a bottom side, the top side facing away from the adjacent structure and the bottom side facing the adjacent structure.

11. The apparatus of claim 10, wherein a C-clip is disposed between the top side of the retainer housing and the spring within the retainer housing.

12. The apparatus of claim 10, further comprising a C-clip and a washer, wherein:
    the washer is disposed between the top side of the retainer housing and the C-clip; and
    the C-clip is disposed between the washer and the spring within the retainer housing.

13. The apparatus of claim 7 wherein the fastener base is positioned between the fastener head and the structure, and the fastener base is secured to the structure.

14. The apparatus of claim 13, wherein the fastener base comprises a plurality of apertures to secure the fastener base to the structure.

15. The apparatus of claim 13, wherein the fastener base is secured to the structure with glue.

16. A method of securing a panel to a structure, comprising:
aligning a threaded hole of an external aircraft panel with an aperture of a structure adjacent the external aircraft panel, wherein the structure has a top side and a bottom side, and wherein the top side faces away from the external aircraft panel and the bottom side faces the external aircraft panel;
inserting a fastener through the aperture and the threaded hole, wherein the fastener comprises a fastener head, a threaded tail, and a wrench insert, and wherein a retainer housing with a spring disposed therein is positioned on the fastener head, and wherein the retainer housing is detached from the fastener;
positioning the fastener head to face the top side of the structure opposite the external aircraft panel;
securing the retainer housing to the structure by securing the retainer housing to a fastener base with a retaining clip, the retaining clip contacting the fastener base; and
tightening the fastener to secure the external aircraft panel to the structure, thereby securing the external aircraft panel to the structure without leaving the fastener head protruding from the external aircraft panel.

17. The method of claim 16, wherein tightening the fastener comprises twisting the fastener after engaging the wrench insert in the threaded tail of the fastener.

18. The method of claim 16, wherein tightening the fastener comprises twisting the fastener after engaging the wrench insert in the fastener head.

19. The method of claim 16, wherein forming a threaded hole in an external aircraft panel comprises disposing a threaded bushing in an external aircraft panel.

\* \* \* \* \*